(12) United States Patent
Frutiger et al.

(10) Patent No.: US 7,774,441 B2
(45) Date of Patent: Aug. 10, 2010

(54) SYSTEM AND METHOD FOR CONFIGURING NODES IN A NETWORK

(75) Inventors: Theo Frutiger, Buffalo Grove, IL (US); James J. Coogan, Des Plaines, IL (US); Alex Cherny, Buffalo Grove, IL (US)

(73) Assignee: Siemens Industry Inc., Alpharetta, GA (US)

( * ) Notice: Subject to any disclaimer, the term of this patent is extended or adjusted under 35 U.S.C. 154(b) by 1278 days.

(21) Appl. No.: 10/839,750

(22) Filed: May 5, 2004

(65) Prior Publication Data

US 2005/0055427 A1 Mar. 10, 2005

Related U.S. Application Data

(60) Provisional application No. 60/492,641, filed on Aug. 5, 2003.

(51) Int. Cl.
*G06F 15/177* (2006.01)
(52) U.S. Cl. .................. 709/221; 709/220; 709/222

(58) Field of Classification Search ................ 709/221
See application file for complete search history.

(56) References Cited

U.S. PATENT DOCUMENTS

| | | | | |
|---|---|---|---|---|
| 6,253,240 B1 * | 6/2001 | Axberg et al. | ............... | 709/223 |
| 6,353,861 B1 * | 3/2002 | Dolin et al. | .................. | 719/318 |
| 6,516,345 B1 * | 2/2003 | Kracht | ....................... | 709/220 |
| 7,085,814 B1 * | 8/2006 | Gandhi et al. | ............... | 709/208 |
| 7,395,359 B2 * | 7/2008 | Reister | .......................... | 710/8 |
| 2002/0161596 A1 * | 10/2002 | Johnson et al. | ............... | 705/1 |

* cited by examiner

*Primary Examiner*—Jeffrey Pwu
*Assistant Examiner*—Abdelnabi O Musa
(74) *Attorney, Agent, or Firm*—Thomas J. Burton

(57) ABSTRACT

A network tool is provided for use when replacing devices in an automatically controlled distributed processing system. The network tool reestablishes all or a portion of the logical connections formerly provided to the node where the replacement device is or will be located. The tool compares data associated with the logical connections of the node and data associated with the logical connections for the replacement device to determine proper logical connection. In one embodiment, the compared data comprises network variables and configuration properties.

18 Claims, 12 Drawing Sheets

SYSTEM AND METHOD FOR CONFIGURING NODES IN A NETWORK

This application claims the benefit of and/or priority to U.S. provisional application Ser. No. 60/492,641 filed Aug. 5, 2003.

FIELD OF THE INVENTION

The present invention relates to distributed processing in automation control systems, and in particular, to automation control systems that use network variables and configuration properties to facilitate distributed processing.

BACKGROUND OF THE INVENTION

Automation control systems are well-known. Such systems include building automation systems for controlling environmental equipment, fire and safety equipment, security equipment, elevator banks, and the like. Other automation control systems include industrial control, food processing, and transportation systems. In general, these systems receive data from sensors that are evaluated to determine control actions to take in order to bring about some condition or perform some operation. For example, an environmental control system uses sensors to detect environmental conditions and system parameters throughout a building or other space to determine control actions that are necessary to bring the regulated space to some defined condition.

There exist a wide variety of sensors for a wide variety of purposes. Sensors can include temperature sensors, infrared body detectors, position indicators, water flow meters, air flow meters, water pressure meters, air pressure meters, and the like. Position indicators, for example, are devices that generate a signal that corresponds to the position of a switch, valve, or vent opening so the system controller may determine whether particular lights, fans, vents, or blower motors are operating or open. The data that is generated by the sensors is provided to one or more controllers in the control system.

The controllers in many cases compare the data to desired values for the particular sensed condition. The desired values are called set points. The controllers perform control actions to bring the sensed parameters into compliance with the conditions corresponding to the set points. In some cases, sensors that sense one condition may be used to effect control of another condition. For example, a sensor data that indicates a person's entry into a room may be used to initiate control actions to achieve lighting, ventilation, and thermal comfort conditions specified for an occupied space. Such control actions may include the activation of blower motors to bring conditioned air into the room through vents that are also opened in response to control signals generated by the controller.

Additional control actions may involve obtaining temperature sensor data and controlling the various devices to maintain the desired temperature. In this manner, the controller may regulate the environmental conditions in a space.

Distributed processing may be used in an environmental control system to coordinate control of the system with the various heating, ventilation and air conditioning (HVAC) functions in the system. For example, an air-handling unit (AHU) in an HVAC system distributes conditioned air to several variable air volume (VAV) terminals in a building. Thus, VAV controllers exchange data with the AHU controller so the AHU appropriately provides conditioned air to the VAVs and the AHU controller may synchronize the operation of these local space controllers.

Different companies, however, frequently manufacture the various devices within a control system. Accordingly, it is possible that a device manufactured by a first company would have a communication protocol different from the protocol used by a device manufactured by a second company. When devices of a system employ different protocol, the consumer must absorb the expense of creating an interface system for various devices. Alternatively, the consumer may limit the system to devices from a limited number of manufactures, all of whom employ the same protocol.

In response to this problem, various "standard" communications protocols have evolved which are used by a number of different manufacturers. By ensuring that a replacement device uses the same protocol as the rest of the network, a consumer can purchase a device with the assurance that the device will be able to communicate with the rest of the consumer's system once installed. One such protocol is the LonTalk protocol, also known as the ANSI/EIA 709-1 Control Networking Standard.

The LonTalk protocol is a layered, packet based, peer-to-peer communications protocol designed specifically for control systems. By using devices with a shared protocol, a consumer ensures that a new device, regardless of its manufacturer, will be able to send and receive messages from other devices already in the network. To this end, the protocol ideally enables communication without prior detailed knowledge of the topology of the network. Accordingly, systems using the LonTalk protocol maintain control functions within the various devices while sharing data with other devices in the system. Such a system may be referred to as an information-based control system.

A network based upon the LonTalk protocol allows remote network management tools to interact with components over the network, including reconfiguration of network addresses and parameters, downloading of application programs, reporting of network problems, and start/stop/reset of component application programs. Beneficially, the network may be implemented over basically any medium, including power lines, twisted pair, radio frequency (RF), infrared (IR), coaxial cable and fiber optic or combinations thereof.

Communications protocols such as LonTalk provide significant advantages in implementation of a distributed processing system. However, there are some difficulties associated with such protocols. One such problem arises when devices are replaced with either devices from a different manufacturer or even updated devices from the same manufacturer. Devices that are configured in accordance with the LonTalk protocol are referred to as LonWorks devices. However, a replacement LonWorks device is typically not configured to interface with a system in the same manner as the LonWorks device being replaced.

The primary means of accessing data within a LonWorks device is via Network Variables (NVs) and Configuration Properties (CPs). The NVs are utilized for "dynamic" data within the control application. An example of dynamic data is current zone temperature. The NVs are the primary mechanism by which data is exchanged between control and monitoring nodes on the network. The CPs are utilized for "static" data. Static data is typically stored in a controller's non-volatile memory and can be used to configure the application and/or control parameters within the controller. Static data can be used to configure, for example, input and output configuration and set points. NVs and CPs are identified, among other things, by a name and a type. The "name" identifies the class of sensor, such as a temperature sensor. A data "type" defines the units, scaling and structure of the data being passed. A number of standard NV types (SNVTs) have been created for commonly used types. Collectively, the NVs and CPs within a LonWorks Controller are referred to as the Node Interface. In addition, NVs and CPs within a controller may be organized and/or associated with Objects.

LonWorks devices include "self-documentation" that can be read and interpreted by a LonWorks tool. Recovery and interpretation of the self documentation from a LonWorks node is the primary and most rudimentary mechanism by which a LonWorks tool obtains information on a node's Node Interface. Self-documentation includes a Program Identification (Program ID).

Each Node Interface must be assigned a Program ID. Rules for assigning Program IDs and guidelines for self-documentation are administered by the LonMark Interoperability Association. In accordance with guidelines of the LonMark Interoperability Association, nodes containing the same Program ID must contain the same Node Interface. Thus, it is assumed that LonWorks devices with identical Program IDs have identical NV and CP names, the same number of NVs and CPs, identical organization into Objects, etc. Accordingly, when the self-documentation of a node changes, the Program ID of any device at the node must also be changed.

Typically, but not always, descriptive NV names are included in the self-documentation stored within the LonWorks node. However, such storage obviously requires memory space. Thus, due to memory constraints, some nodes do not include NV names in the self-documentation stored within the nodes. In such cases, LonWorks tools must rely on other means for associating an NV with a descriptive name. The most common, and indeed de facto standard for doing so, is to utilize what is known as an external File (XIF file).

The XIF format is determined and maintained by the LonMark Interoperability Association. The data in the XIF file includes a Program ID and details regarding the functional profile of the device. The XIF file is a text file description of the Node Interface that can be used by tools to have access to an application's Node Interface without the need to retrieve the data from the actual node. The association of the XIF file data with the Node Interface is accomplished via the Program ID.

A Program ID is an identifier for a device that includes a manufacturer identification, a device class, a device subclass and a model number. All devices having the same Program ID will have identical functional profiles. The functional profile is data that defines the application layer interface of the device including NVs, CPs, defaults and power-up behaviors.

Thus, when initially installing a system, a network tool is used to obtain the profiles of the various devices. The network tool is a program loaded into a computer, which may be, for example, a portable computer, a handheld device, or an administrative computer connected to the system. Then, in order to establish the proper recipients and suppliers of messages in a LonWorks system, a process referred to as "binding" is performed during network setup. The binding process establishes the logical connection between the devices by connecting the NV Objects (NVOs) from one node or nodes to the NVOs of the same type on other node or nodes. From a network perspective, the devices can thus be thought of as nodes having specific configurations. The logical connections are then stored within the configuration file used by the system.

When a replacement device is connected to the system, logical connections with the replacement device must be established. If the replacement device is identical to the previous component, i.e. the same Program ID, establishing the logical connections may be fairly simple. Some network management tools have the capability of verifying the Program ID, and merely re-establishing the logical connections already defined for all of the nodes that are members of the respective connection.

However, in the event the replacement component has a different Program ID, such as may occur when adding functionality, switching manufacturers, or providing an entirely new functionality, prior art network management tools assume the node to be different, and do not automatically attempt to establish the logical connections to the device. Moreover, if the original network management database is not available and a network image cannot be recovered by the network management tool, then the node must be manually configured. A typical controller may have sixty NVs and up to one hundred CPs. Obviously, manually configuring the node is labor intensive in engineering and testing and prone to error. The problems are exacerbated if more than one component is replaced at the same time.

What is needed is a network tool capable of automatically re-establishing NV connections and CPs even when a device is replaced with a node having a different Program ID. It would be beneficial if the network tool were capable of identifying conflicts or changes in node configuration, allowing a user to quickly assess the conflicts or changes. It would be further beneficial if the network tool provided potential conflict resolution options.

SUMMARY OF THE INVENTION

A system made in accordance with the principles of the present invention overcomes limitations previously encountered with the reestablishment of a node. The system of the present invention includes the capability of storing node configuration values. Once a device at a node has been replaced, the present system may be used to automatically restore logical NV connections and CP values. The actions performed or proposed by the system may also be presented to the installer to inform the installer of the actions and/or to allow the installer to approve actions before they occur. Additionally, any conflicts identified by the system may be presented to the installer for resolution. According to one embodiment, options for resolving the conflicts are also presented.

The system may suitably comprise a technique that allows an installer to identify particular NV connections and CPs that are required to match between a former node and the replacement node before automatic connection is performed. Additionally and/or alternatively, a minimum number of NV connections and CPs may be required to match before any automatic operation is conducted. In one embodiment, the proposed actions are presented to the installer for authorization prior to any automatic operation.

It is an object of some embodiments of the present invention to allow storage in the network of a set of NV s and CPs for a node in a network.

It is an object of some embodiments of the present invention to analyze the stored set of NVs and CPs with the NVs and CPs of a replacement device to ascertain similarities and differences between the two.

A preferred embodiment of the present invention reconfigures the NVs and CPs associated with the replacement device based upon the above analysis.

Optionally, a system according to the present invention allows an installer to identify specific NVs and CPs that must be present prior to reconfiguration.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1A:
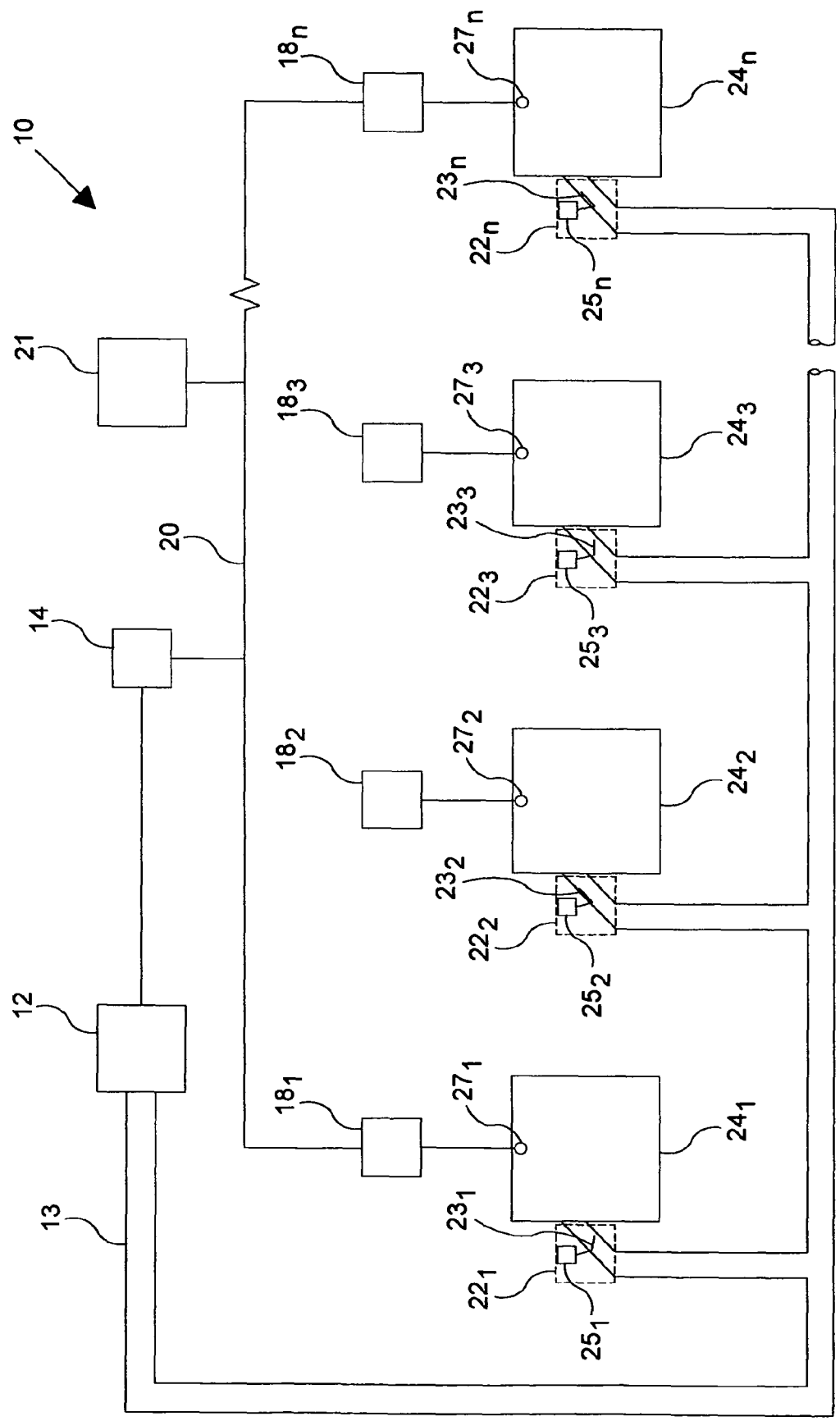
FIG. 1a shows a block diagram of an air distribution system in which the system and the method of the present invention may be used.

FIG. 1a shows an exemplary air distribution system 10 in which an air-handling unit (AHU) controller 14 controls the operation of AHU 12. Controller 14 is coupled as a sink controller through a network 20 to a plurality of variable air volume (VAV) controllers $18_1 \ldots 18_n$ that operate VAV terminals $22_1 \ldots 22_n$ bringing conditioned air to local spaces $24_1 \ldots 24_n$. VAV terminals $22_1 \ldots 22_n$ place dampers $23_1 \ldots 23_n$ in one of a plurality of positions between a fully open position and a minimum allowed open position.

Dampers are typically not allowed to be fully shut in order to ensure there is some fresh air supplied to a space, even if the temperature will be driven out of a desired range. This may be a needed safety measure, for example, to ensure an adequate amount of oxygen is supplied to each space. The minimum allowed open position may thus be set by a CP for the distribution system based upon the most restricted space. That is, the system's minimum allowed open position is established at a value that ensures every space will be above the minimum turnover rate for the most populated space. Of course, this means that most spaces have a minimum allowed open position that is in excess of the actual requirement for that space, leading to system inefficiency.

Returning to the discussion of FIG. 1a, dampers $23_2$ and $23_n$ are in a fully open position, and VAV terminals $23_1$ and $23_3$ are opened to the system minimum allowed open position as set by a CP. Accordingly, air flow from AHU 12 through distribution header 13 to the individual spaces is controlled in a space by space manner within the system.

VAV controllers $18_1 \ldots 18_n$, AHU controller 14, and network 20 are, preferably, implemented using LONWorks technology. To this end, AHU controller 14 and controllers $18_1 \ldots 18_n$ are controllers that have passed LonMark certification, which means at least a portion of the controller's network interface is standardized. The network interface includes NV inputs, NV outputs, and network configuration inputs. The configuration file for network 10, including all of the logical connections between the devices, is stored in network computer 21. Network bus 20 is, preferably, a LonTalk network. NEURON, LonMark, and LonTalk are all trademarks of Echelon Corporation of Palo Alto, Calif. By way of example, the controllers may suitably comprise NEURON® micro-controller, available from Echelon Corporation of Palo Alto, Calif.

The LonTalk protocol is an open protocol that supports interoperability between controllers and other HVAC components that are not manufactured by the same source. In accordance with the protocol, each of the controllers comprises an external interface file including the device's Program ID, NVs, and CPs.

As shown in FIG. 1a, controllers $18_1 \ldots 18_n$ individually control environmental parameters of spaces $24_1 \ldots 24_n$, respectively, and they all are under the overall control of AHU controller 14. That is, each of the controllers $18_1 \ldots 18_n$ is coupled to actuators $25_1 \ldots 25_n$ for dampers $23_1 \ldots 23_n$, respectively and to temperature sensors $27_1 \ldots 27_n$. Of course, more sensors may also be included in the system, such as damper position indicators, etc. AHU controller 14 communicates with VAV controllers $18_1 \ldots 18_n$ over network 20 to synchronize their operation in controlling airflow and other environmental parameters in the respective spaces, so the parameters of the spaces correspond to set point conditions stored in the controllers. Typically, in order to coordinate their operation, AHU controller 14 also requires status data from VAV controllers $18_1 \ldots 18_n$ regarding parameters in their respective local spaces and the position of the dampers.

Figure 2:
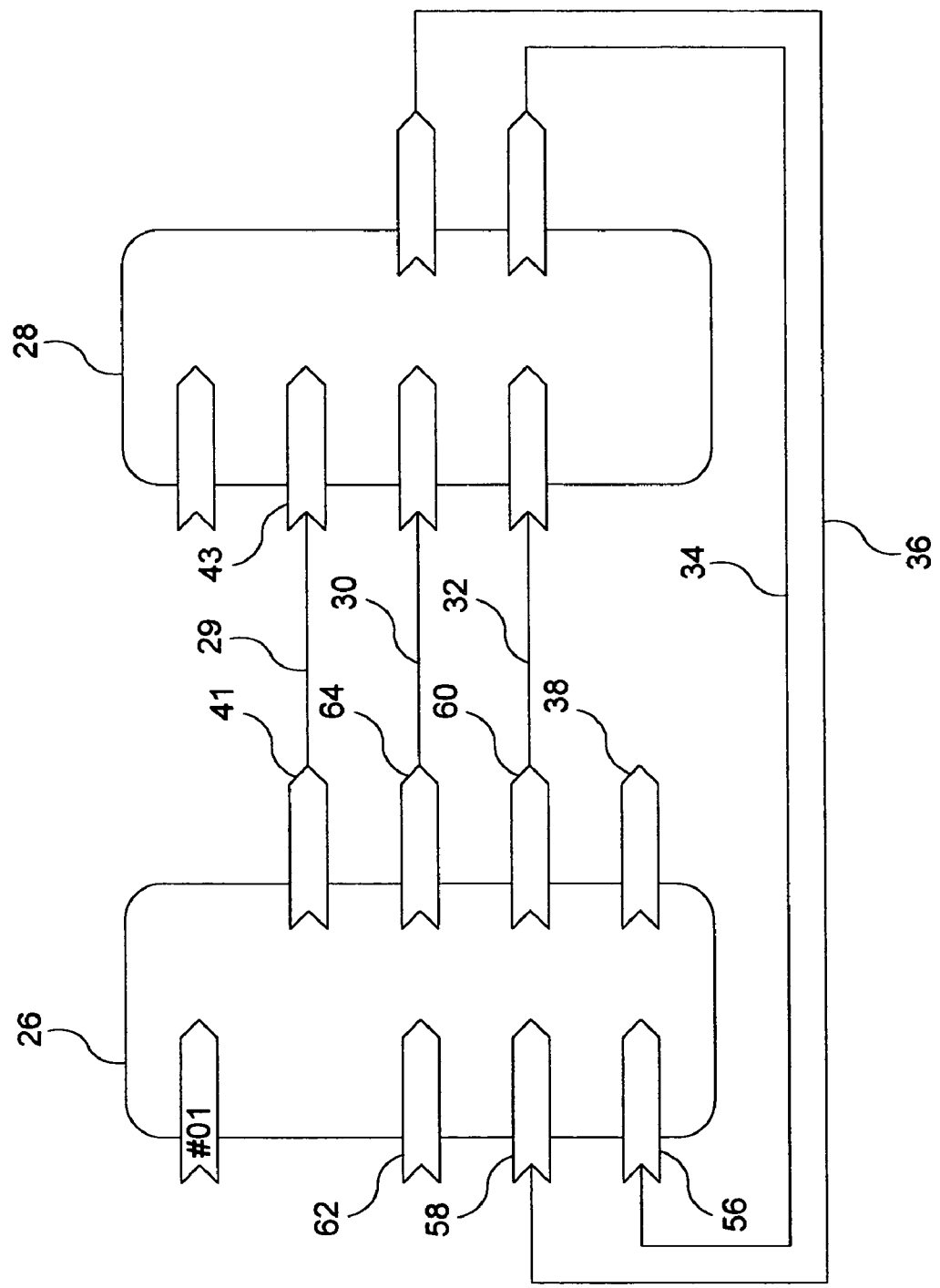
FIG. 2 shows a partial functional profile of the logical connections between two devices.

Accordingly, when the network 10 was initially installed, the logical connections between the devices were defined and stored in the configuration file maintained in network computer 21. By way of example, FIG. 2 shows a representation of partial functional profiles 26 and 28 of AHU controller 14 and VAV controller $18_1$, respectively. These partial functional profiles and the logical connections shown therein are not actual physical connections. Rather, the profiles are a tool that can be used to represent the types of messages that can be sent and received by a device in accordance with the logical connections stored in the configuration file of the network on computer 21. Accordingly, while terms and words may be used herein that ascribe physical characteristics to the partial functional profiles, this is done only to provide an understanding of the present invention and not as a limitation of the present invention.

In this embodiment, VAV controller $18_1$ includes a CP which establishes the minimum allowable open position for damper $23_1$ of VAV terminal $22_1$. Thus, VAV controller $18_1$ is designed to accept a CP indicating that VAV controller $18_1$ should cause its associated terminal to be positioned at the minimum allowable open position, and another CP indicating that VAV controller $18_1$ may open its associated terminal. In practice, a number of additional logical connections would be made between AHU controller 14 and VAV controller $18_1$ as well as between these devices and other devices.

The CP indicating the minimum allowed open position for the system is passed from connection 41 of AHU controller 14 to connection 43 of VAV controller $18_1$ through logical connection 29. The "open permitted" and "position to minimum"

CPs are sent to VAV controller $18_1$ by AHU controller 14 through logical connections 30 and 32 respectively, based upon logical processes within AHU controller 14 using data received from all of the VAV controllers. In this way, AHU controller 14 ensures that higher priority areas are maintained at the proper temperature. By way of example, if the maximum amount of air is being supplied by AHU 12, and the temperature of a critical space is not being properly maintained at a set point even with the associated damper in the fully open position, then controllers for less critical spaces may be commanded to position to minimum their respective dampers by AHU controller in order to redirect the air being supplied to the less critical spaces to the more critical space.

AHU controller 14 is informed of the status of the VAV controllers, such as need for conditioned air, through logical connection 34 which in this example is a NV. The status of VAV terminal $22_1$, such as a percentage of full open, may also be passed to AHU controller through logical connection 36 as another NV.

In addition to logical connections to other controllers, AHU controller 14 may also have some additional functional capabilities. One such capability is represented in FIG. 2 as available connector 38. Connector 38 is discussed below.

In operation, VAV controller $18_1$ sends a NV through logical connection 34 to AHU controller 14, indicating that conditioned air is needed in space $24_1$. AHU controller 14 sends a CP through logical connection 30 to VAV controller $18_1$ allowing VAV controller $18_1$ to further open damper $23_1$ of VAV terminal $22_1$. Of course, the permission to further open is not sent specifically in response to an isolated "request" from VAV controller $18_1$. Rather, the message is sent based upon an analysis of a plurality of inputs to AHU controller 14 such as available conditioned air and other spaces that are in need of or are receiving conditioned air.

Figure 3:
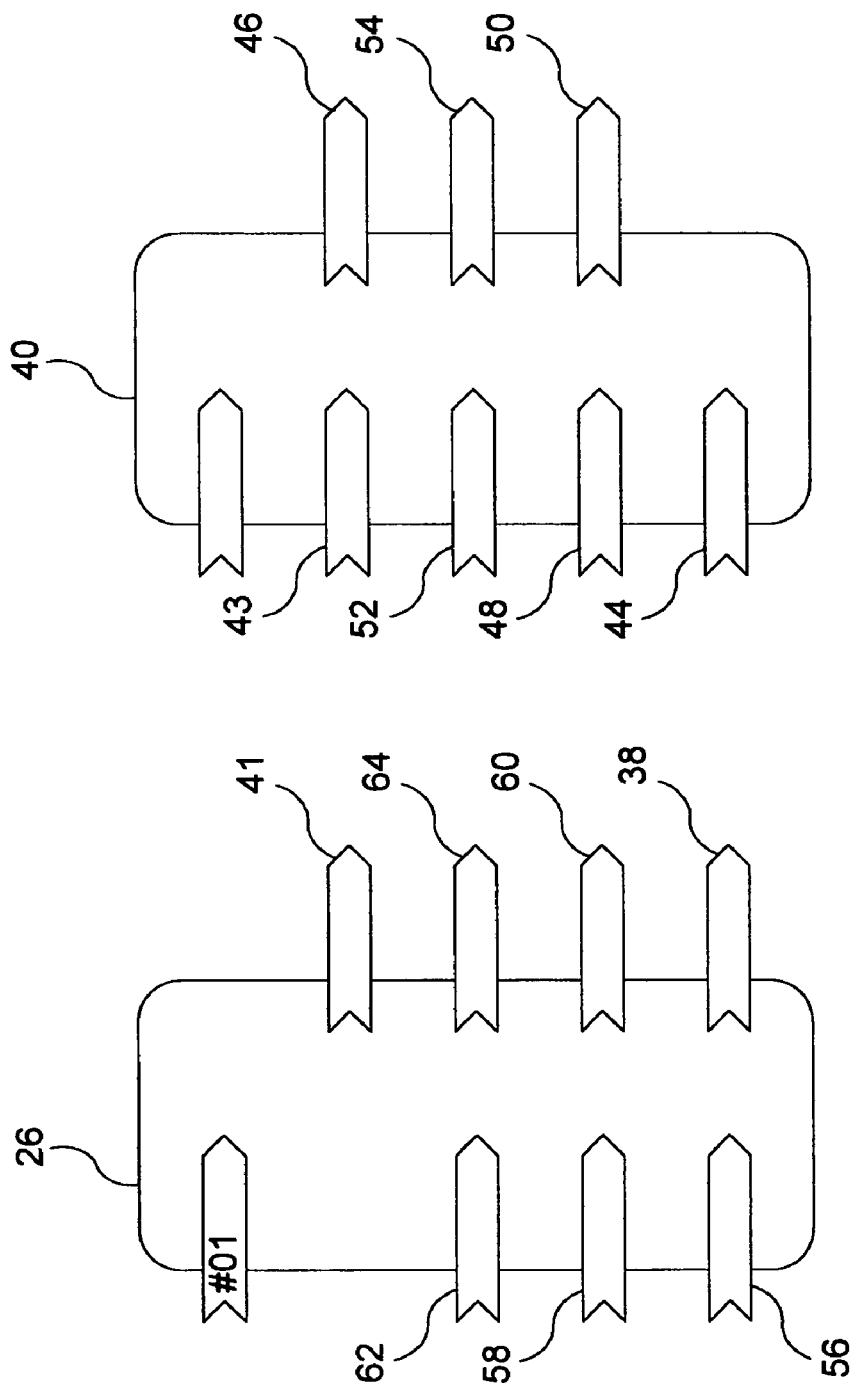
FIG. 3 shows a partial functional profile of the one of the devices of FIG. 2 and a replacement device.

FIG. 3 shows a partial representation of functional profiles 26 and 40 of AHU controller 14 and a replacement VAV controller, respectively. The replacement VAV controller is to be installed into network 20 as an upgrade at the node previously occupied by VAV controller $18_1$. The replacement VAV controller in this embodiment is capable of controlling a terminal to a variable minimum allowable open position.

Variable minimum allowable open positions are useful, for example, in networks that are associated with spaces that have different numbers of people working in the various spaces serviced by the network. For these networks, the minimum allowed turnover rate of air for a given space will be affected by the number of people in the space. A space with a large number of people will require a higher turnover rate than a space with a small number of people to ensure that oxygen levels are maintained at a desired level. Accordingly, a heavily populated space may require a minimum allowable open position of 15 percent, while a sparsely populated space may require only 5 percent. Use of a variable minimum open position thus allows a more efficient positioning of dampers, since the minimum allowed open position of a specific space may be set below the minimum allowed open position for the rest of the system.

The variable minimum allowable open capability is indicated in FIG. 3 by available connections 44 and 46. Connection 44 receives an NV that modifies, for a specific terminal, the minimum allowed open position from the minimum allowed open position set by a CP. Connection 46 is used to pass status messages regarding the actual open position. Connection 46 is used, in this embodiment, since the NV range passed through logical connection 36 is limited to values between the minimum allowed open value set by the CP and full open. The NV range associated with connection 46 allows values between the minimum allowed open value set by the NV received through connection 44 and full open.

The replacement VAV controller also has connectors 43, 48, 50, 52 and 54. As indicated in the external interface file, the NVs and CPs associated with these connectors are of the same name and SNVT passed through logical connections 29, 32, 34, 30 and 36 of FIG. 2, respectively.

Figure 1B:
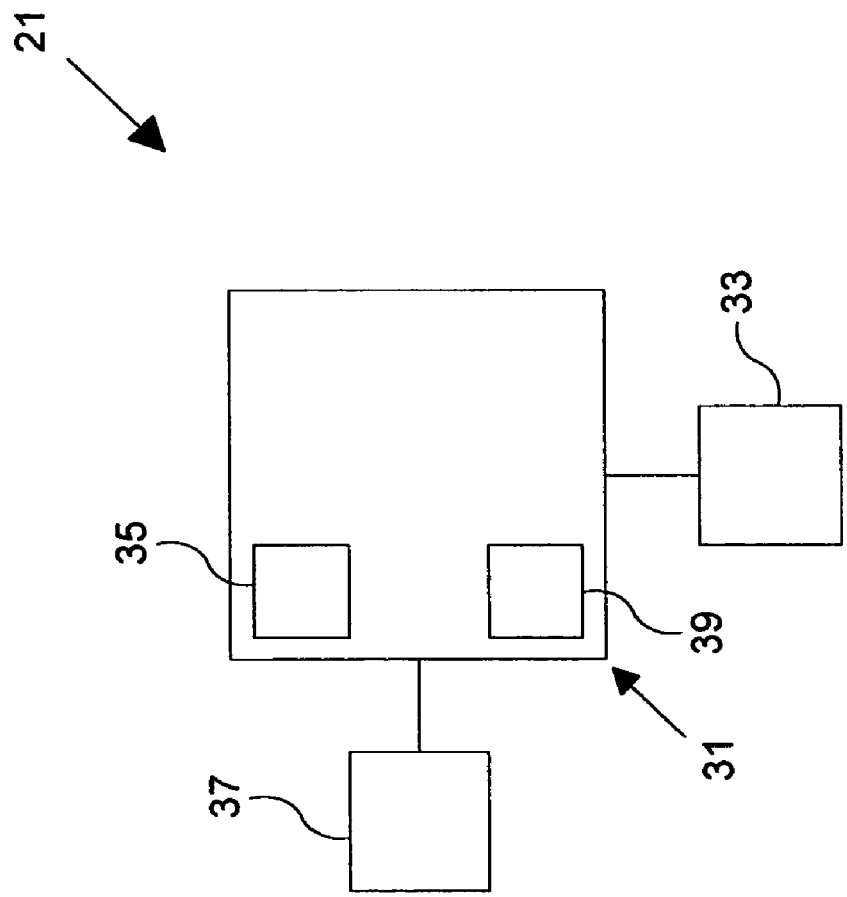
FIG. 1b shows a block diagram of an embodiment of the present invention.

In accordance with one embodiment of the present invention, a network tool is used to assist in establishing or reestablishing logical connections between the replacement controller and network 10. The network tool in this embodiment is shown in FIG. 1b as part of computer 21. Network tool 31 comprises user input device 33, read/write memory 35, display 37 and processing circuit 39. Processing circuit 39 comprises a storage media with instructions for various operations stored therein. Some of the operations are discussed below.

A number of alternative embodiments for the network tool are possible within the scope of the present invention. By way of example, but not of limitation, the network tool may be in the form of a handheld device, portable computer, or a remote computer operably connected to network 10. Other embodiments may include a communications interface configured to connect to computer 21 or some other part of network 10.

Figure 4:
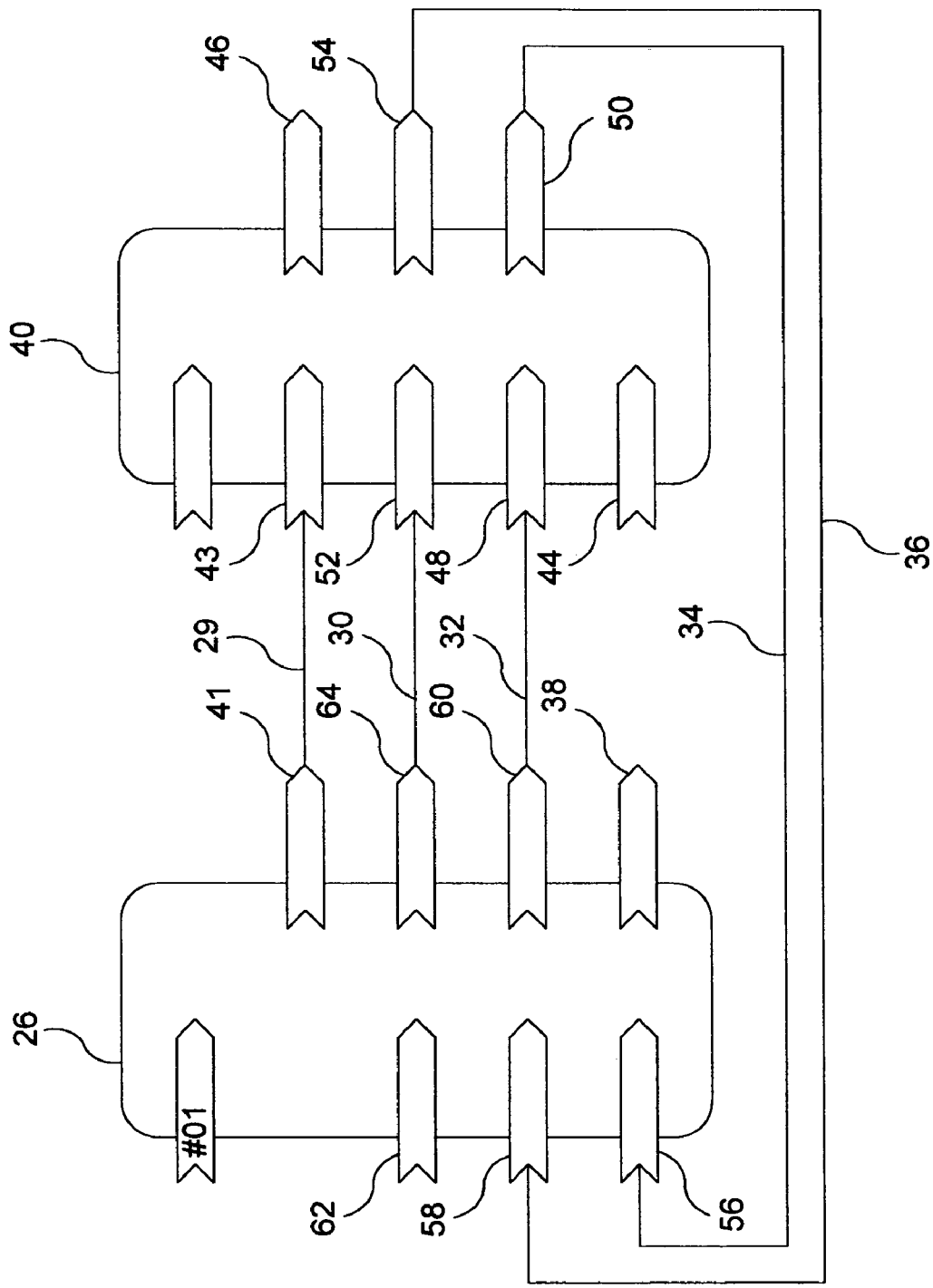
FIG. 4 shows a partial functional profile of logical connections between the devices of FIG. 3.

The operation of a network tool is explained more fully below, however, a brief description of the operation of network tool 31 is provided here in conjunction with a description of the profiles of FIG. 3 and FIG. 4. Initially, network tool 31 stores the logical connections associated with the node for VAV controller $18_1$. Storage may be in the form of dedicated memory or any other memory with which the network tool may work including the configuration file of network 10. In this embodiment, the network tool 31 stores the logical connections in read/write memory 35.

The network tool then acquires the Program ID of replacement VAV controller $18_1'$ and compares it to the Program ID of VAV controller $18_1$. In this example, the Program IDs do not match. Accordingly, network tool 31 acquires the functional profile of the replacement VAV controller $18_1'$ comprising profile 40 of FIG. 3. Network tool 31 then verifies that the name and SNVT associated with connectors 43, 48, 50, 52 and 54 matches the names and SNVTs previously passed from the node formerly occupied by VAV controller $18_1$. Network tool 31 then "re-establishes" logical connection 29 between connectors 41 and 43, logical connection 30 between connectors 64 and 52, logical connection 32 between connectors 60 and 48, logical connection 34 between connectors 56 and 50, and logical connection 36 between connectors 58 and 54, by saving this data to the configuration file for network 10 stored in computer 21. A representation of the logical connections is shown in FIG. 4.

Those of skill in the relevant art will appreciate that "storage" of the logical connections associated with replacement VAV controller $18_1$ may be accomplished by simply not overwriting certain portions of the configuration file. The actual file maintenance/creation being a design choice.

Once the above logical connections have been made, the system may be restored to the operational condition that existed before VAV controller $18_1$ was removed from the system. FIG. 4 shows, however, that connectors 38 and 62 are still available in functional profile 26. In this example, connectors 38 and 62 are used in conjunction with a system capability to modify the minimum open position of a terminal to a value less than the system minimum allowable open position set by a CP. Connectors 38 and 62 were previously not connected to VAV controller $18_1$ because VAV controller $18_1$ did not have a corresponding capability. After installing replacement VAV controller $18_1'$ however, network 10 may be upgraded to this capability. Availability of the variable minimum allowable open capability with replacement VAV controller $18_1'$ is indicated by connectors 46 and 44.

In accordance with one embodiment of the present invention, after performing the above operations, network tool 31 is programmed to further analyze the devices remaining in network 10 along with VAV controller $18_1'$ to determine if any new capabilities have been enabled by installing the replacement VAV controller $18_1 1'$. This analysis reveals that connectors 38 and 44 have matching names and SNVTs, as do connectors 46 and 62. Accordingly, this fact is presented to the installer using any user interface tool, a number of which are well known in the relevant art. The installer may then allow the network tool to establish the logical connections needed to upgrade to the new functionality. This is shown by logical connections 66 and 68 shown in FIG. 5.

Figure 5:
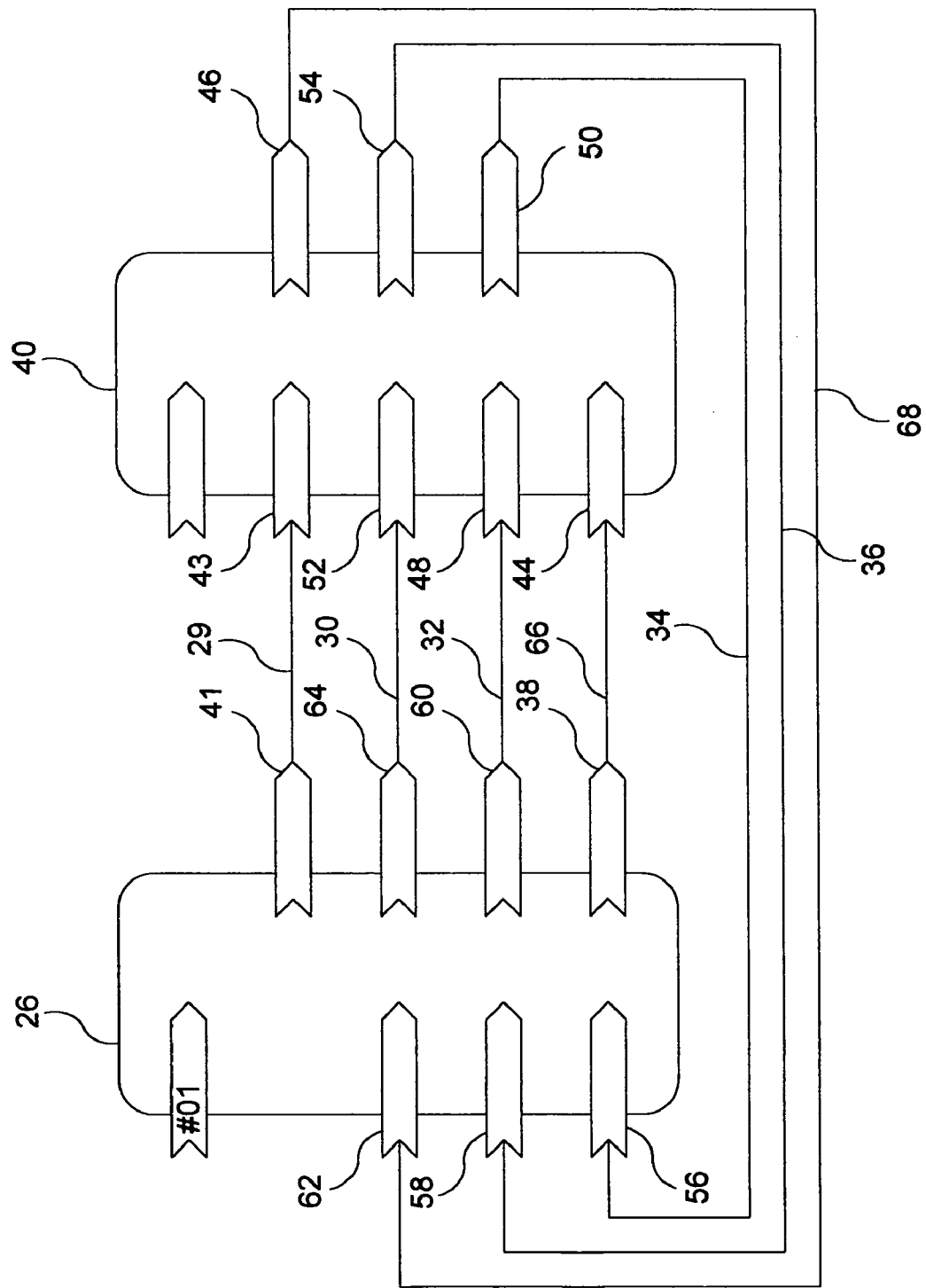
FIG. 5 shows a partial functional profile of additional logical connections between the devices of FIG. 3.

In the embodiment of FIG. 5, the system maintained the logical connections previously established for a non-variable minimum allowable open system, namely, logical connections 29 and 36. Those of skill in the art will recognize that this is a design choice. In certain applications, it may be desired and/or required to break the non-variable minimum allowable open related connections, or other replaced connections. Such alternative variations are within the scope of the present invention.

Figure 6:
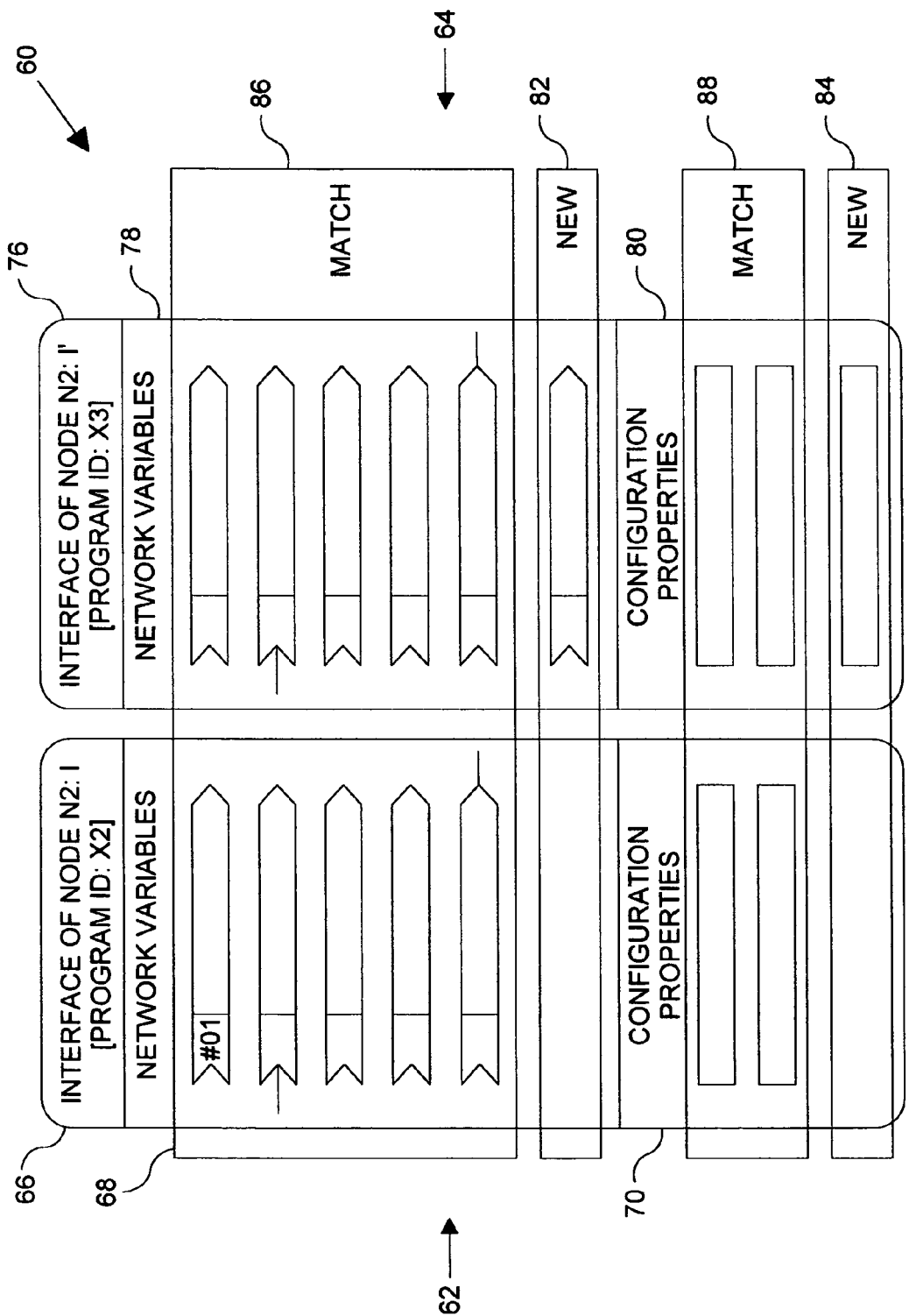
FIG. 6 shows an embodiment of a display of a comparison by a network tool between the functional profile of a saved device and a replacement device in accordance with the present invention.

Referring now to FIG. 6, a screen displayed to an installer in accordance with one embodiment of the present invention is described. In this embodiment, the network tool is programmed to configure logical connections for a replacement device, even if the connections are new. Once the logical connections have been made, screen 60 is displayed to an installer on a display.

Screen 60 comprises original node configuration window 62 and updated node configuration window 64. Original node configuration window 62 comprises node and device identification field 66. From field 66, the installer is informed of the node that has been updated, node "N2:I", along with the Program ID for the device originally installed at node N2:I which in this example is "X2". "N:2" identifies the node, while the letter "I" indicates that the connections shown below field 66 were associated with the initial node configuration. The original NVs as stored in the configuration file are displayed in field 68 and original CPs are displayed in field 70. Original node configuration 62 thus provides the installer with complete information as to the original device previously located at node N2:I, and the system functionality provided by the original device.

Similarly, updated node configuration window 64 comprises node and device identification field 76. Field 76, informs the installer that the node configuration has changed, as indicated by the identification of the node as "N2:I'" "I'" being a first update of the node. The installer is further informed that the Program ID for the replacement device installed at node N2:I is "X3". Because the Program IDs in fields 66 and 76 do not match, the installer knows that a connection by connection analysis of the logical connections available with the replacement device has been performed by the network tool.

The NVs for the updated node that are the same as NVs shown in field 68 of original node configuration 62 are displayed in field 86 as a "match". Similarly, CPs for the updated node that are the same as CPs shown in field 70 of original node configuration 62 are displayed in field 88 as a "match". In this example, a new NV is associated with the updated node and attention drawn to this by the use of "new" in field 82. A new CP is associated with the updated node and attention drawn to this by the use of "new" in field 84. The installer is thus informed that new system functionality has been provided with the installation of the replacement device.

Those of skill in the art will appreciate that data may be displayed to an installer in a number of ways. By way of example, but not of limitation, the data may be displayed in text form, on an alpha-numeric display, or graphically. Moreover, the display need not incorporate all of the data shown in screen 60. These modes of display and others are within the scope of the present invention. Nevertheless, screen 60 has additional advantages of intuitively presenting relevant data by highlighting changes while providing full detail of the nodal configuration both prior to and after installation of the replacement device.

Figure 7:
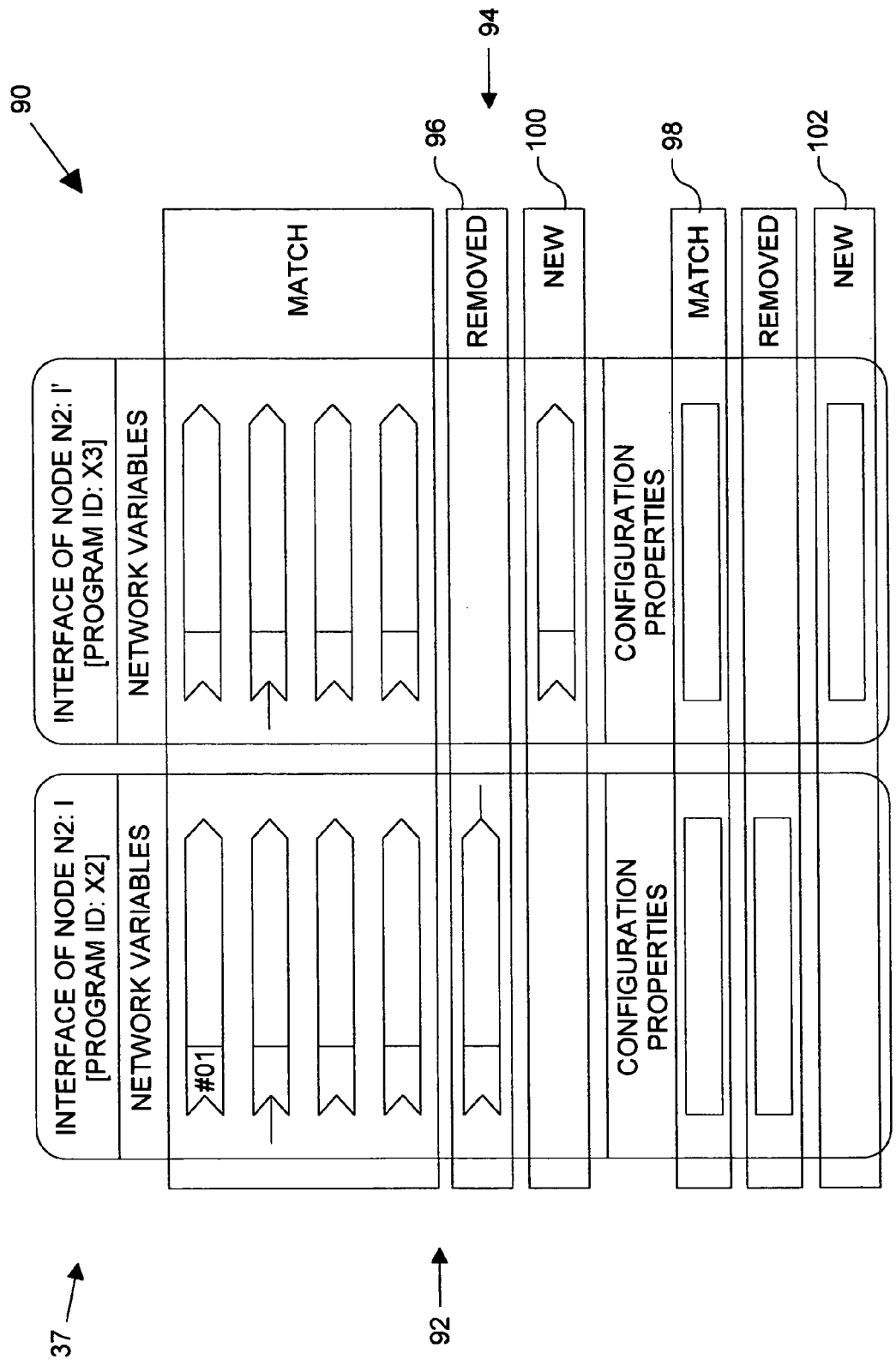
FIG. 7 shows an embodiment of a display of a comparison by a network tool between the functional profile of a saved device and a replacement device in accordance with the present invention.

FIG. 7 shows an exemplary screen displayed when new NV and CP connections have been added to a node while some original NV and CP connections have been removed. Screen 90 comprises original node configuration window 92 and updated node configuration window 94. The nodal information shown in original node configuration window 92 is the same as the information shown in original node configuration window 62 of FIG. 6. In the example of FIG. 7, however, a different device was used to replace the original device. This is indicated by Program ID "X4". In this example, NV 96 and CP 98 are highlighted as being "removed" from the nodal connections while NV 100 and CP 102 are highlighted as being "new" nodal connections.

While not shown in FIG. 7, those of skill in the art will appreciate that within the scope of the present invention, a variety of data could be presented to the installer by a network tool. By way of example, but not of limitation, a comparison display need not include a listing of all NVs and CPs that matched. Additionally, more detail may be displayed with respect to the NVs and CPs that do not match.

Moreover, because, as a design choice, NVs and CPs need not be identical, the differences within "matching" NVs and CPs may be displayed. Specifically, in one embodiment of a system comprising the present invention, NVs that are input to a device include a number of attributes such as name, identifier, index, type, and proprietary information. Of these attributes an installer may define a subset of attributes that the network tool must match before establishing logical connections.

For example, as discussed above, an NV "name" field may identify the nature of the sensor, such as a "temperature" sensor while the "type" field identifies characteristics such as units and scaling. In many instances, other fields, such as the proprietary information field, is simply not critical. Accordingly, if an installer defines only name and type as being required to "match" for a particular NV, then the network tool may establish logical connections even though all of the fields within the NV of a replacement device do not match the fields for the original device. In this scenario, it may be useful as a double check on the newly established connections to highlight to an installer the fields that did not match. Similarly, differences between matching CPs may be displayed.

Figure 8A:
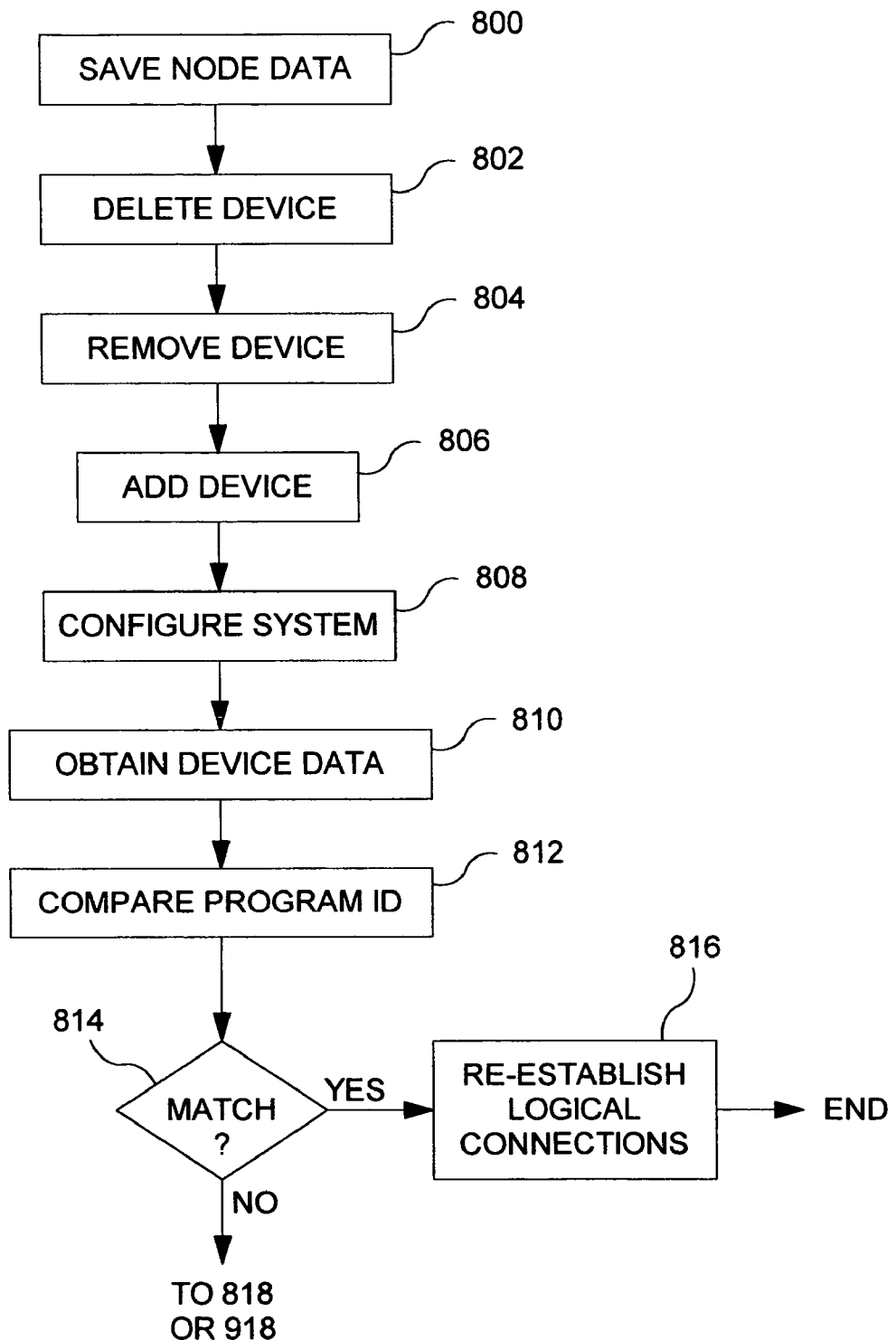
FIGS. 8a and 8b are a flowchart of an exemplary method that may be used to implement the principles of the present invention in a network tool.

Referring now to FIG. 8a, a flowchart of an exemplary method that may be used to implement the principles of the present invention is shown. In this embodiment, the network tool has been programmed by the installer to call CPs and NVs having identical names and types a "match." In general, the program will first check the Program ID of the replacement device against the Program ID of the original device. If there is no match, then the NVs and CPs of the replacement device are checked for matches with the nodal configuration of the original device. Any unmatched NVs and CPs will be displayed as new. Any NVs and CPs associated with the original device that are not matched will be displayed as removed. The network tool will then allow the installer to direct the matched NVs and CPs to be re-established by the network tool. Re-establishment is effected by writing the logical connections in the configuration file of the network.

Specifically, at step 800, a user of a network tool embodying the present invention saves the Program ID, CPs and NVs associated with a specific node into memory provided with the network tool as stored node data. At step 802 the device to be replaced is deleted from the system configuration file used in conjunction with the network. This file may be located, for example, in a computer used to monitor the network. The device is then physically removed from the system at step 804. When a replacement device has been identified, the device is physically installed at step 806. The device is added to the system configuration at step 808. At step 810, data present on the new device's external interface file is retrieved as device data. The Program ID of the new device is then compared to the stored node Program ID from step 800. If the node and device Program IDs match, then the new device is an exact replacement, and all former logical connections for the node may be reestablished, and no new logical connections are needed. Accordingly, at step 816 the logical connections are made, i.e. the network configuration file is updated, and the network tool ends.

Figure 8B:
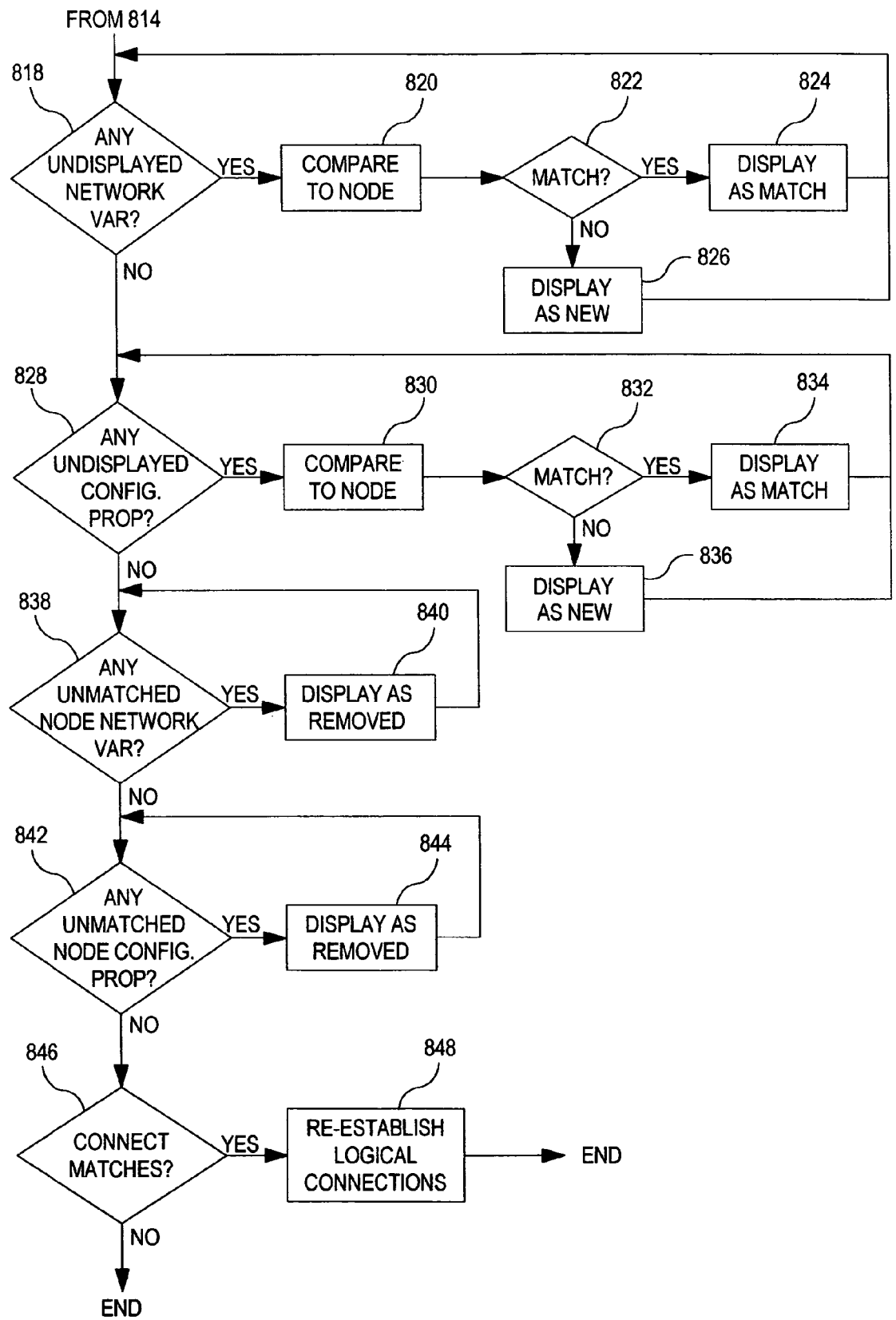

If the Program ID does not match at step 814, the system proceeds to step 818 shown in FIG. 8b. At step 818 the device data is checked for any NVs that have not yet been displayed at step 824 or 826 (for the first iteration, no NVs have been displayed, thus any NVs in the device forces a "Yes"). If an undisplayed device NV is present, the undisplayed device NV is compared to the node NVs stored at step 800. If at step 822 the device NV includes sufficient similarity to a node NV as discussed above, then the device NV and the node NV are displayed as a match at step 824. If the device NV does not match any node NV, then the device NV is displayed as a new NV at step 826. It is "new" because the node did not previously have a logical connection associated with the NV. Thus, it is a newly available functionality, but not a newly configured functionality. It cannot be configured until a match is defined and a logical connection is made.

The system then continues at step 818 until all device NVs have been displayed at step 824 or step 826. Once all device NVs have been displayed, then at step 828 the device data is checked for any CPs that have not yet been displayed at step 834 or step 836. For the first iteration, there will not be any displayed CPs, so any device CP forces a "Yes." If an undisplayed CP is present, the undisplayed device CP is compared to the node CPs stored at step 800. If at step 832 the device CP includes sufficient similarity to a node CP as discussed above, then the device CP and the node CP are displayed as a match at step 834. If the device CP does not match any node CP, then the device CP is displayed as a new CP at step 836. It is "new" because the node did not previously have a logical connection associated with the CP. Thus, it is a newly available functionality, but not a newly configured functionality. It cannot be configured until a match is defined and a logical connection is made.

The system then continues at step 828 until all device CPs have been displayed at step 834 or step 836. Then at step 838 the node data is checked for any node NVs that have not yet been displayed at step 824. If an undisplayed node NV is found, it is displayed at step 840 as a removed NV. It is "removed" in the sense that even when the logical connections are re-established, because no "match" has been found, no logical connection for this NV will be made. Thus, the NV will no longer be passed to or from the node. The system then continues to step 838 until all node NVs stored at step 800 have been displayed either at step 824 or at step 840.

Once all node NVs have been displayed, then at step 842 the node data is checked for any node CPs that have not been displayed at step 836. If an undisplayed node CP is found, it is displayed at step 844 as a removed CP. It is "removed" in the sense that even when the logical connections are re-established for the node, because no "match" has been found, no logical connection for this CP will be made. Thus, the CP will no longer be passed to or from the node. The system then continues to step 842 until all node CPs stored at step 800 have been displayed either at step 834 or at step 844.

With all node and device CPs and NVs displayed to the installer as being matched, new or removed, the installer at step 846 chooses whether or not the matched logical connections should be reestablished. If it is desired to make the connections, then at step 848 the system reestablishes the logical connection(s) for the matched CPs and/or NVs and ends. Alternatively, the installer may choose to terminate the tool without making the connections.

Figure 9A:
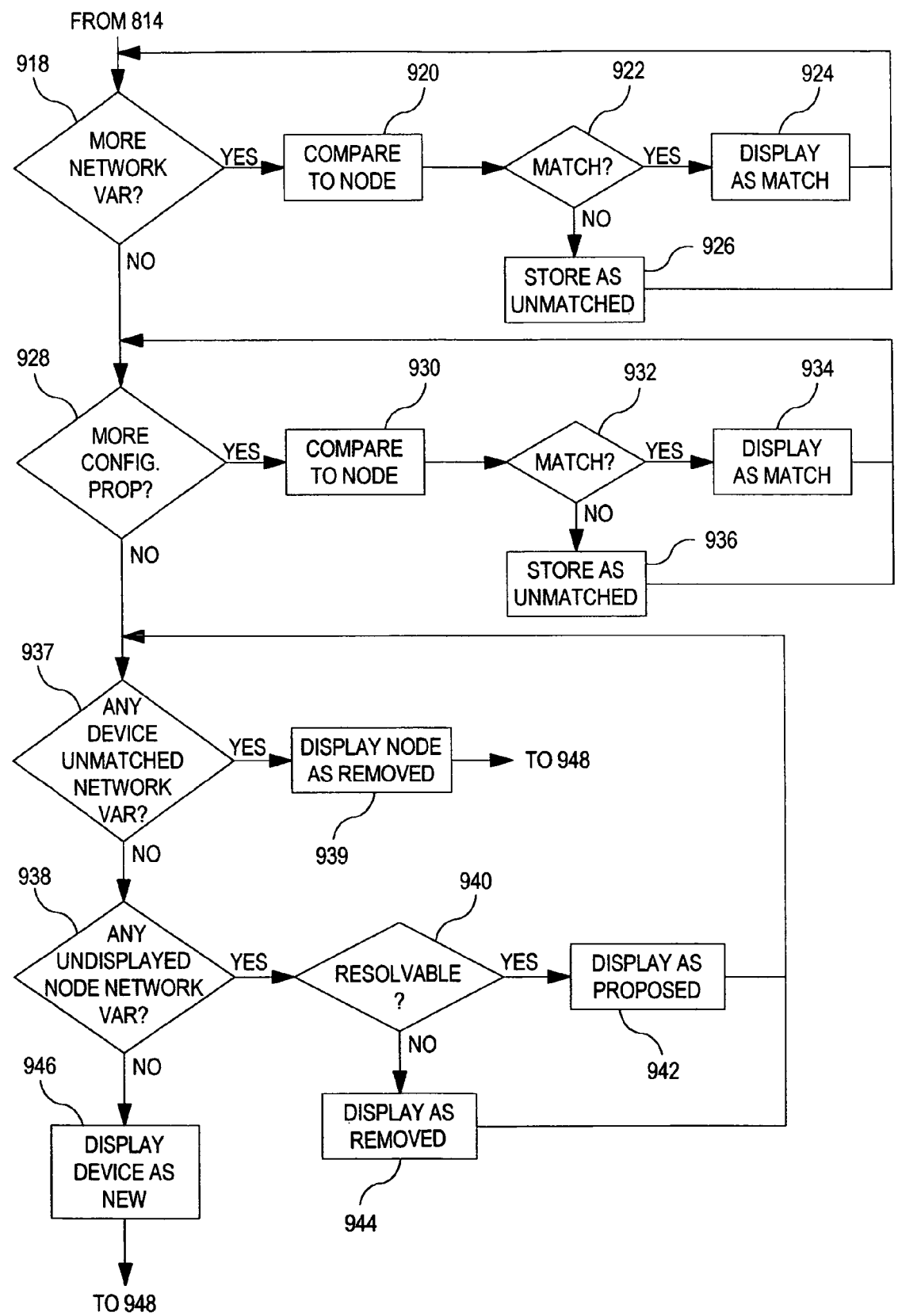
FIGS. 9a and 9b are a flowchart of an alternative exemplary method that may be used in conjunction with the method of FIG. 8a to implement the principles of the present invention in a network tool.
Figure 9B:
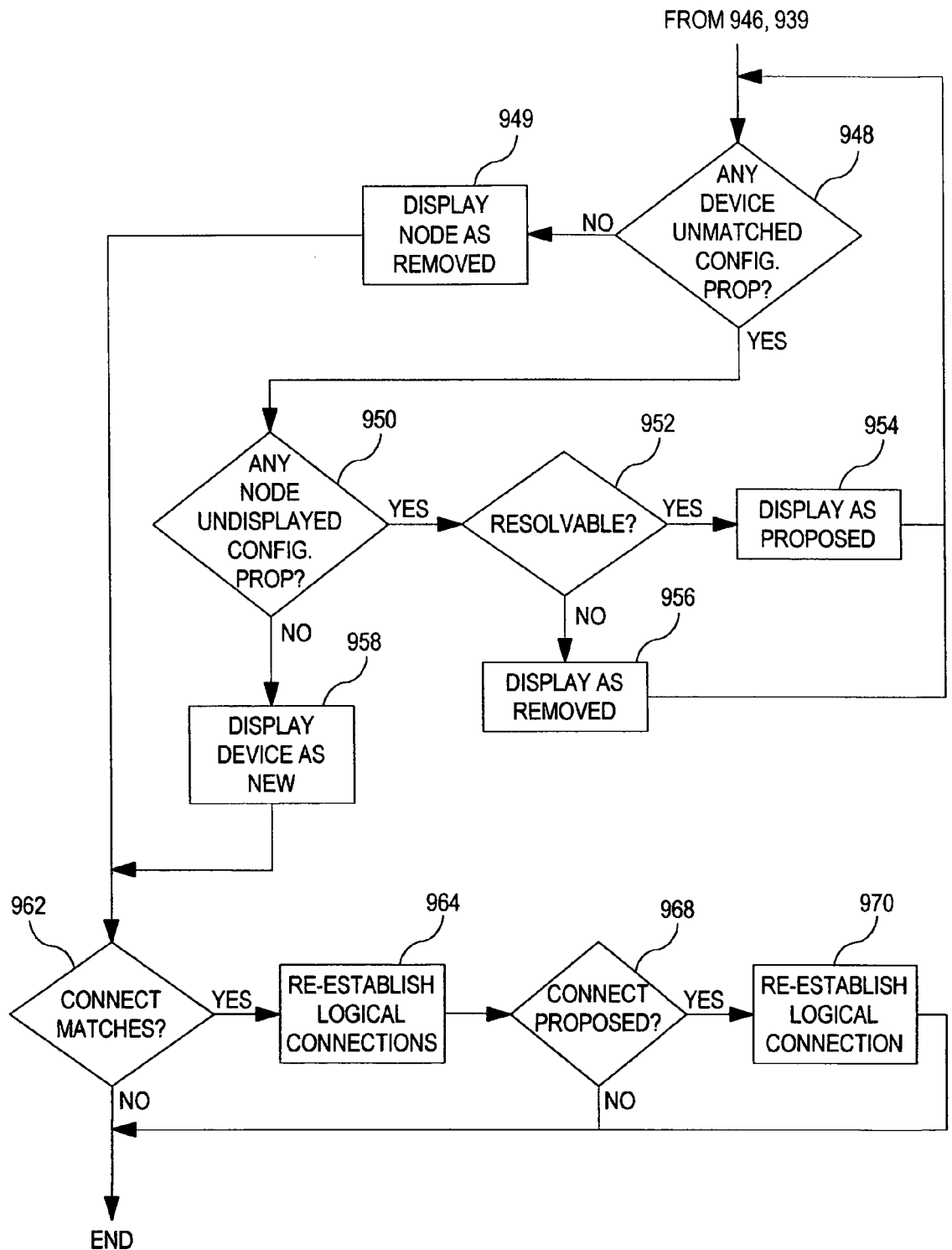

In alternative embodiments, the present invention proposes possible resolutions of conflicts to an installer. One such embodiment follows the steps of FIG. 8a from 800 through 814. However, instead of proceeding to step 818, this embodiment proceeds to step 918 of FIG. 9 if the answer in step 814 is in the negative.

Steps 918 through 924 and 928 through 934 are similar to steps 818 through 824 and 828 through 834 and are not further discussed herein. At step 926 and 936, however, any unmatched device NVs and/or CPs are stored in a suitable memory, such as read/write memory provided with the network tool, as unmatched device NVs and/or CPs respectively.

At step 937, any device NVs that were stored at step 926 as unmatched are identified. If there are no unmatched device NVs that have not been displayed at step 942, then there are no further NVs to resolve and the system proceeds to step 939 and displays any remaining undisplayed node NVs stored at step 800 as removed NVs. The system then proceeds to step 948.

If there is an unmatched and undisplayed device NV at step 937, then at step 938 the system checks for any node NVs stored at step 800 that have not been displayed at step 924, step 944 or step 942. If there is an undisplayed node NV, then at step 940 the system attempts to resolve the undisplayed node NV with any unmatched device NVs.

Those of skill in the relevant art will understand that the resolution process may include a variety of different techniques. By way of example, but not of limitation, the fields may be assigned a value and any matching field is scored according to its value, with "resolution" being the highest score achieved. Additionally and/or alternatively, the definition of "resolution" may include a threshold score. Moreover, a variety of approaches may be used in place of the process discussed herein. By way of example, but not of limitation, CPs may be resolved first and NVs resolved later in the process. Furthermore, it may be desired to allow more than one potential resolution/match for a given NV or CP. These variations and others are considered to be within the scope of the present invention.

If the undisplayed node NV is resolved to match an unmatched device NV, then at step 942 the system treats the two NVs as a potential match, and the undisplayed node NV is displayed along with the corresponding device NV. The system then proceeds to step 937 to check for any additional unmatched undisplayed device NVs. If the undisplayed node NV cannot be resolved, then at step 944 the undisplayed node NV is displayed as removed. It is "removed" in the sense that even when the logical connections are re-established for the node, because no "match" has been found, no logical connection for this NV will be made. Thus, the NV will no longer be passed to or from the node.

In an alternative embodiment, the process is modified to allow more than one unmatched device NV to be displayed as a potential match. If more than one device NV is proposed, the system may indicate a ranking of the proposed resolutions.

Returning to FIG. 9a, if at step 938 there are no remaining undisplayed node NVs, then at step 946, the remaining unmatched undisplayed device NV(s) is/are displayed as new. It is "new" because the node did not previously have a logical connection associated with the NV. Thus, it is a newly available functionality, but not a newly configured functionality. It cannot be configured until a match is defined and a logical connection is made. The system then proceeds to step 948, shown in FIG. 9b.

At step 948, any device CPs that were stored at step 936 as unmatched are identified. If there are no unmatched device CPs that have not been displayed at step 954, then there are no further CPs to resolve and the system proceeds to step 949 and displays any remaining undisplayed node CP stored at step 800 as a removed CP. It is "removed" in the sense that even when the logical connections are re-established for the node, because no "match" has been found, no logical connection for this CP will be made. Thus, the CP will no longer be passed to or from the node. The system then proceeds to step 962.

If there is an unmatched and undisplayed device CP at step 948, then at step 950 the system checks for any node CPs stored at step 800 that have not been displayed at step 934, step 954 or step 956. If there is an undisplayed node CP, then at step 952 the system attempts to resolve the undisplayed node CP with any unmatched and undisplayed device CP.

Those of skill in the art will understand that the resolution process may include a variety of different techniques as discussed above with respect to NVs, all of which are considered within the scope of the present invention. By way of additional example, but not of limitation, the process may compare the nodal data and the device data for changes in units. Accordingly, if a node data is in degrees Fahrenheit and a device data is in degrees Centigrade, the resolution algorithm may propose a unit correction to be applied to the device. Of course, this type of correction could be designed to be performed automatically upon detection.

If the undisplayed node CP is resolved to match an unmatched and undisplayed device CP, then at step 954 the undisplayed node CP is displayed along with the best potential unmatched and undisplayed device CP. The system then proceeds to step 948 to check for any additional unmatched and undisplayed device CPs. If the undisplayed node CP cannot be resolved, then at step 956 the undisplayed node CP is displayed as removed. It is "removed" in the sense that even when the logical connections are reestablished for the node, because no "match" has been found, no logical connection for this CP will be made. Thus, the CP will no longer be passed to or from the node.

In an alternative embodiment, the process is modified to allow more than one unmatched device CP to be displayed as a potential match. If more than one device CP is proposed, the system may indicate a ranking of the proposed resolutions.

Returning to FIG. 9b, if at step 950 there are no remaining undisplayed node CPs, then at step 958, the remaining unmatched undisplayed device CP(s) is/are displayed as new. It is "new" because the node did not previously have a logical connection associated with the CP. Thus, it is a newly available functionality, but not a newly configured functionality. It cannot be configured until a match is defined and a logical connection is made. The system then proceeds to step 962.

At step 962, the installer chooses whether or not to accept the matched CPs and NVs, or a subset of the presented connections. If they are not accepted, then the process ends. If they are accepted, then at step 964 the network tool reestablishes the logical connections for the matched CPs and/or NVs by updating the configuration file for the network. At step 968, the installer chooses whether or not to accept the proposed resolutions for CPs and NVs. If they are not accepted, then the process ends. If they are accepted, then at step 797 the network tool reestablishes the logical connections for the proposed resolutions by writing them to the configuration file of the network and ends.

Those of skill in the art will that appreciate that design choices may result in any of a number of alternative processes. By way of example, but not of limitation, a designer may choose to have the entire process proceed automatically without input from the installer after step 800. Alternatively, each logical connection, matched or proposed, may be individually presented for acceptance. These alternatives and others are within the scope of the present invention.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A method of configuring a node in a network of an automation control system wherein each of a plurality of heating, ventilation, and air conditioning (HVAC) devices is represented by a corresponding node in the network, the method comprising the steps of:

removing a logical connection between the network and a node representing a first HVAC device, the HVAC device configured to alter a physical output of the HVAC system;

storing the functional profile of the first HVAC device, the functional profile of the first HVAC device identifying at least one operating parameter relating to the physical output of the HVAC system;

obtaining a functional profile of a second HVAC device, the functional profile of the second HVAC device identifying at least one operating parameter for the second HVAC device;

comparing the functional profile of the first HVAC device to the functional profile of the second HVAC device; and reestablishing at least one logical connection between the network and the node based upon the comparison such that the node represents the second HVAC device;

wherein the step of storing comprises the step of storing network variables associated with the first HVAC device, the network variables for the first HVAC device identifying dynamic operating parameters for the first HVAC device, and wherein the step of obtaining comprises obtaining network variables associated with the second HVAC device, and wherein the step of reestablishing comprises the step of configuring logical connections between the network and the node based on a comparison of the stored network variables and obtained network variables.

2. A method of configuring a node in a network of an automation control system wherein each of a plurality of heating, ventilation, and air conditioning (HVAC) devices is represented by a corresponding node in the network, the method comprising the steps of:
  removing a logical connection between the network and a node representing a first HVAC device;
  storing the functional profile of the first HVAC device, the functional profile of the first HVAC device identifying at least one operating parameter;
  obtaining a functional profile of a second HVAC device, the functional profile of the second HVAC device identifying at least one operating parameter for the second HVAC device;
  comparing the functional profile of the first HVAC device to the functional profile of the second HVAC device; and
  configuring at least one logical connection between the network and the node based upon the comparison such that the node represents the second HVAC device
  wherein the step of storing comprises the step of:
  storing network variables associated with the first HVAC device, the network variables for the first HVAC device identifying dynamic operating parameters for the first HVAC device, and wherein the step of obtaining comprises;
  obtaining network variables associated with the second HVAC device, and wherein the step of configuring comprises the step of;
  configuring logical connections between the network and the node based on a comparison of the stored network variables and obtained network variables.

3. The method of claim 2, wherein the step of configuring comprises the step of:
  reestablishing the logical connection between the network and the node if the stored network variables and obtained network variables are the same.

4. The method of claim 2, wherein the step of storing comprises the step of:
  storing configuration parameters associated with the first HVAC device, the configuration parameters identifying static operating parameters for the first HVAC device, and wherein the step of obtaining comprises;
  obtaining configuration parameters associated with the second HVAC device, and wherein the step of configuring comprises the step of;
  reestablishing the logical connection between the network and the node if the stored configuration parameters and obtained configuration parameters variables are the same.

5. The method of claim 4, wherein the step of obtaining comprises the step of: obtaining at least some of a functional profile of the second HVAC device through the network.

6. The method of claim 1, further comprising the step of: displaying a result of the comparison, and wherein the step of configuring comprises the step of: configuring a logical connection after the result has been accepted.

7. The method of claim 6, wherein the step of displaying comprises the step of; displaying at least some of the functional profile of the first HVAC device or the second HVAC device that does not correspond to the other profile.

8. The method of claim 7, wherein the step of displaying comprises the step of; displaying at least some of the functional profile of the first HVAC device that corresponds to at least some of the functional profile of the second HVAC device.

9. The method of claim 7, further comprising the step of:
  identifying at least some of the functional profile of the first HVAC device that does not correspond to the functional profile of the second HVAC device; resolving the lack of correspondence by analyzing data within the functional profile of the first HVAC device and the functional profile of the second HVAC device, and wherein the step of displaying comprises the step of:
  displaying the resolution of the lack of correspondence.

10. The method of claim 1, further comprising, prior to the step of comparing the first HVAC device profile to the second HVAC device profile, the steps of:
  storing a program identification for the first HVAC device node; obtaining a program identification for the second HVAC device;
  comparing the first HVAC device program identification to the second HVAC device program identification; and
  determining that the first HVAC device program identification does not match the second HVAC device program identification.

11. A network tool for use in an automatically controlled distributed processing system comprising; a storage media device storing instructions to:
  store a representation of the logical connections between a plurality of HVAC devices of an environmental control system;
  define at least one of the plurality of devices as a node profile comprising the logical connections between the at least one of the plurality of devices and each of the other plurality of devices, the node profile further comprising first network variables identifying dynamic operating parameters of the at least one of the plurality of devices;
  obtain at least some of a functional profile of a device that is not one of the plurality of HVAC devices, the functional profile including second network variables defining at least one operating parameter for the device;
  compare the node profile including the first network variables to the profile of the device that is not one of the plurality of HVAC devices including the second network variables; and
  configure at least one logical connection between at least one of the plurality of HVAC devices and the device that is not one of the plurality of HVAC devices based upon the comparison.

12. The tool of claim 11, wherein the tool is operable to read at least some of the functional profile of a device that is not one of the plurality of devices from an external interface file stored in the device that is not one of the plurality of devices.

13. The tool of claim 11, wherein the tool is operable to provide a result of the comparison for display.

14. The tool of claim 13, wherein the tool configures the at least one logical connection in response to the logical connection being accepted by an installer.

15. The tool of claim 14, wherein the tool is operable to identify to an installer the logical connections that correspond between associated logical connections and the profile of the device that is not one of the plurality of devices, and to identify to an installer the logical connections that do not correspond between associated logical connections and the profile of the device that is not one of the plurality of devices.

16. A network tool for use in an automatically controlled distributed processing system comprising; a storage media device storing instructions to:

store a representation of the logical connections between a plurality of HVAC devices of an environmental control system;

define at least one of the plurality of devices as a node profile comprising the logical connections between the at least one of the plurality of devices and each of the other plurality of devices;

obtain at least some of a functional profile of a device that is not one of the plurality of HVAC devices, the functional profile defining at least one operating parameter for the device;

compare the node profile to the profile of the device that is not one of the plurality of HVAC devices; and configure at least one logical connection between at least one of the plurality of HVAC devices and the device that is not one of the plurality of HVAC devices based upon the comparison, wherein the logical connections and the functional profile comprise formatted network variables and configuration properties.

17. The tool of claim 16, wherein the tool is programmed to accept from a user a first set of network variable data fields, such that when the first set of data fields in a network variable of the associated logical connections is the same as the first set of data fields in a network variable of the functional profile of the device that is not one of the plurality of devices, the tool treats the network variable of the associated logical connections as a match with the network variable of the functional profile of the device that is not one of the plurality of devices.

18. The tool of claim 17, wherein the tool is programmed to accept from a user a second set of network variable data fields, such that when the second set of network variable data fields in a network variable of the associated logical connections is the same as the second set of data fields in a network variable of the functional profile of the device that is not one of the plurality of devices, but the first set of data fields in the network variable of the associated logical connections is not the same as the first set of data fields in the network variable of the functional profile of the device that is not one of the plurality of devices, the tool treats the network variable of the associated logical connections as a potential match with the network variable of the functional profile of the device that is not one of the plurality of devices.

* * * * *